United States Patent [19]

The et al.

[11] Patent Number: 4,678,477

[45] Date of Patent: Jul. 7, 1987

[54] PROCESS FOR LOWERING LEVEL OF CONTAMINANTS IN BAYER LIQUOR BY MEMBRANE FILTRATION

[75] Inventors: Paul J. The, Murrysville; Chanakya Misra, Pittsburgh, both of Pa.

[73] Assignee: Aluminum Company of America, Pittsburgh, Pa.

[21] Appl. No.: 816,242

[22] Filed: Jan. 6, 1986

[51] Int. Cl.[4] ............................................. B01D 13/01
[52] U.S. Cl. ................................. 23/305 A; 423/121; 423/130; 423/600; 210/650; 210/651; 210/652; 210/654
[58] Field of Search ............... 210/650, 651, 652, 654; 423/112, DIG. 14, 130, 121, 600; 23/305 A

[56] References Cited

U.S. PATENT DOCUMENTS

| | | | |
|---|---|---|---|
| 2,653,716 | 9/1953 | Corona | 210/62 |
| 3,295,961 | 1/1967 | Colombo et al. | 75/101 |
| 3,422,008 | 1/1969 | McLain | 210/22 |
| 3,457,032 | 7/1969 | De La Breteque | 23/52 |
| 3,729,542 | 4/1973 | Goheen | 423/119 |
| 4,038,039 | 7/1977 | Carruthers et al. | 23/239 R |
| 4,046,855 | 9/1977 | Schepers et al. | 423/130 |
| 4,101,629 | 7/1978 | Mercier et al. | 423/121 |
| 4,161,446 | 7/1979 | Coillet | 210/23 H |
| 4,207,182 | 6/1980 | Marze | 210/650 |
| 4,215,094 | 7/1980 | Inao et al. | 423/123 |
| 4,275,042 | 6/1981 | Lever | 423/130 |
| 4,280,987 | 7/1981 | Yamada et al. | 423/119 |
| 4,282,191 | 8/1981 | Bird et al. | 423/119 |
| 4,347,132 | 8/1982 | Davis | 210/104 |
| 4,366,129 | 12/1982 | Czeglédi et al. | 423/112 |
| 4,495,067 | 1/1985 | Klein et al. | 210/87 |
| 4,496,524 | 1/1985 | Bush | 423/122 |

FOREIGN PATENT DOCUMENTS 2415872 10/1974 Fed. Rep. of Germany .
2945152 5/1980 Fed. Rep. of Germany .

OTHER PUBLICATIONS

*Encyclopedia of Chemical Technology*, 1978, vol. 2, pp. 140–143.

Chapurlat, Cl. Brousse and Quentin, J. P., *Desalination*, 18, No. 2, Apr. 1976, Elsevier Scientific Publishing Co., pp. 137–153.

*Primary Examiner*—David Sadowski
*Assistant Examiner*—Jeff Peterson
*Attorney, Agent, or Firm*—Andrew Alexander; John P. Taylor

[57] ABSTRACT

A system is disclosed for the purification of a caustic solution to remove impurities therefrom comprises: bringing the caustic solution into contact under pressure with the outside of a plurality of porous hollow fibers each having at least one open end and coated with a semipermeable membrane and collecting purified solution from the open ends of the hollow fibers. In a preferred embodiment, the filtering medium comprises porous hollow polysulfone fibers coated with a semipermeable sulfonated polysulfone membrane.

19 Claims, 4 Drawing Figures

MEMBRANE ULTRAFILTRATION FLOW SHEET

MEMBRANE ULTRAFILTRATION FLOW SHEET

MEMBRANE ULTRAFILTRATION FLOW SHEET

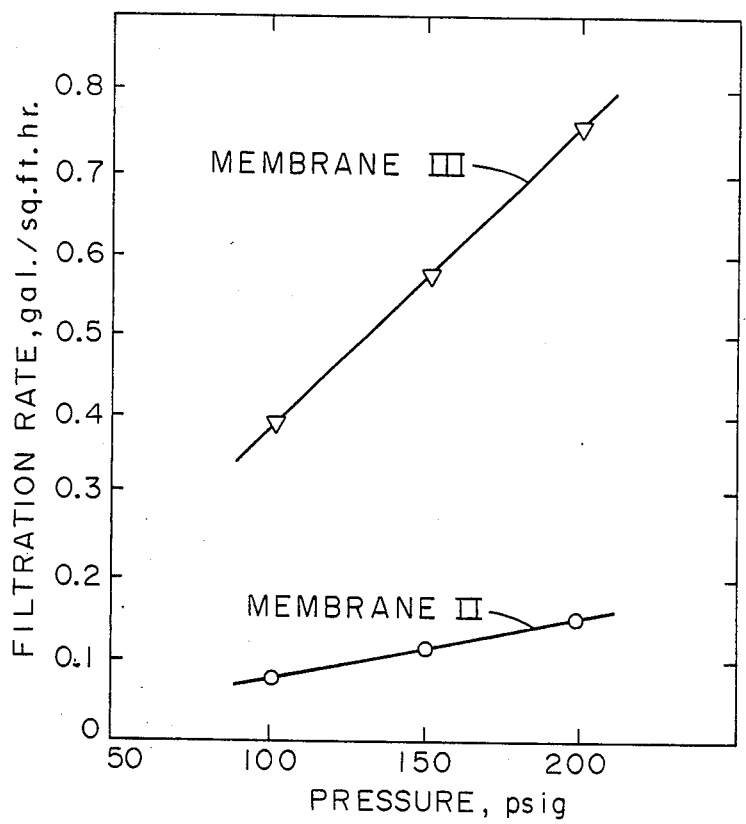
FIG. 3 — EFFECT OF PRESSURE ON FILTRATION RATE
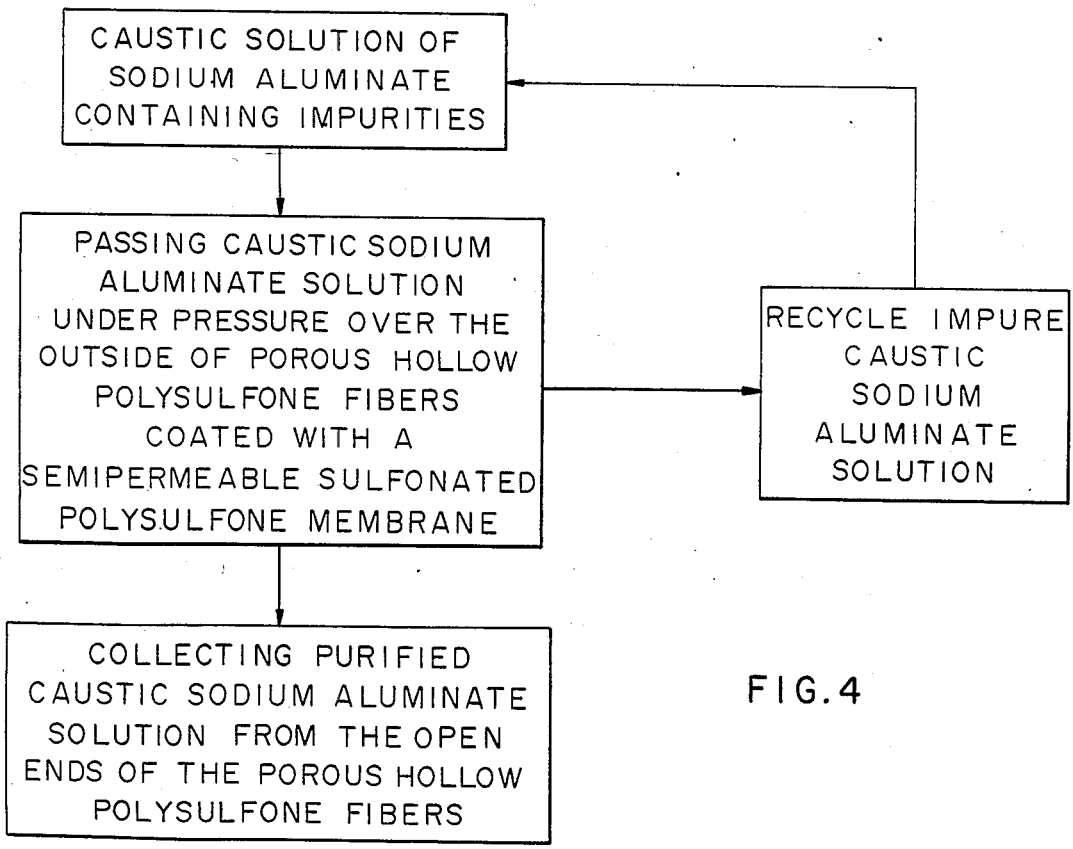
FIG. 4

PROCESS FOR LOWERING LEVEL OF CONTAMINANTS IN BAYER LIQUOR BY MEMBRANE FILTRATION

BACKGROUND OF THE INVENTION

1. Field of the Invention

This invention relates to the purification of a caustic liquid. More particularly, this invention relates to the purification of a caustic liquid such as a Bayer liquor by membrane filtration.

2. Description of the Related Art

It is well known that the presence of organic and inorganic impurities in a caustic sodium aluminate liquor, also known as Bayer liquor because of the Bayer process which produces such a liquor in the digest of aluminum-bearing ore, causes process problems, lowers liquor productivity, and reduces the purity of the produce alumina. Difficulties caused by the organic impurities include lowered alumina yield, generation of excessive fine aluminum hydroxide particles, a higher impurity content in the alumina, colored liquor and aluminum hydroxide, lower red mud settling rate, loss of caustic due to formation of sodium organic compounds, increased liquor density, higher viscosity, raising of the boiling point, and foaming of the liquor.

Numerous methods are known for controlling and/or removing the organic material in Bayer process liquor. These include the treatment of the process liquor with sodium hypochlorite or other oxidizing agents such as oxygen or air. For example, German patent document Off. No. 2,945,152 describes a process for removing organic compounds from Bayer liquor by heating the liquor to 120° to 350° C. and introducing oxygen containing gas until a partial pressure of 3 to 30 atmospheres is reached. Inao et al U.S. Pat. No. 4,215,094 discloses a process for removing organic substances by contacting the aluminate solution with molecular oxygen containing gas in the presence of copper ions as a catalyst at an elevated temperature, e.g. 180° to 300° C.

It is also known to remove some impurities in a Bayer liquor by treatment with alkaline earth compounds. Schepers et al U.S. Pat. No. 4,046,855 teaches the treatment of aluminate liquor with a magnesium compound to remove organic materials. Mercier et al U.S. Pat. No. 4,101,629 treats a solution from the Bayer process with a barium compound to remove impurities. German patent document Off. No. 2,415,872 involves the addition of a calcium compound to the process liquor to remove the humic matter as insoluble calcium compounds.

Impurity levels of organic materials such as sodium oxalate have also been removed from sodium aluminate solutions as taught by Lever U.S. Pat. No. 4,275,042 by the use of cationic sequestrants comprising quaternary nitrogen compounds possessing medium and long chain alkyl groups and a single cationic charge. DeLaBretique U.S. Pat. No. 3,457,032 also discloses purification of a strongly alkaline solution such as sodium aluminate solution by treating the solutions with anion exchange resins of strongly basic and macroreticular type which are said to widely eliminate iron, silica, titanium, zinc, and organic acid impurities.

The removal of sodium oxalate from a sodium aluminate spent liquor solution by spraying the concentrated liquor onto a packing material is disclosed by Carruthers et al U.S. Pat. No. 4,038,039. Bush et al U.S. Pat. No. 4,496,524 teaches the removal of sodium oxalate from a sodium aluminate spent liquor by treatment with ethanol to cause the sodium oxalate to precipitate.

Yamada et al U.S. Pat. No. 4,280,987 removes carbon compounds from Bayer liquor by adjusting the molar ratio of the aluminum component to the sodium component and then heating the liquor to form sodium aluminate and drive off the carbon compounds as carbon dioxide.

Bird et al U.S. Pat. No. 4,282,191 describes the removal of zinc impurities from a caustic sodium aluminate solution using zinc sulfide seed to cause precipitation of the zinc in the liquor. Columbo et al U.S. Pat. No. 3,295,961 discloses a process for removal of iron impurities from the red mud slurry from a Bayer process by first drying the mud and then heating it to reduce the iron compound to metallic iron which is then separated from the dried mud using magnetic separation. Goheen U.S. Pat. No. 3,729,542 teaches the removal of iron impurities in a sodium aluminate solution by filtering the solution through a bed of iron particulate.

Conventional filtration is also, of course, known in the separation of sodium aluminate solutions from the red mud residue of a Bayer process digestion. For example, Corona U.S. Pat. No. 2,653,716 describes the cleaning of filter cloths used to separate sodium aluminate solutions from red mud.

The use of osmotic type filtration is known in the purification, for example, of water using reverse osmosis. Typical of such apparatus and associated processing are the disclosures in U.S. Pat. Nos. 3,422,008 McLain; 4,161,446 Coillet; 4,367,132 and Davis; 4,495,067 Klein et al. However, the purification of a highly caustic solution such as a sodium aluminate solution from a Bayer process presents problems not normally encountered when purifying water.

SUMMARY OF THE INVENTION

It is therefore an object of this invention to provide a system for purifying caustic solutions such as sodium aluminate solutions by filtration.

It is another object of this invention to provide a system for purifying caustic solutions such as sodium aluminate solutions by membrane ultrafiltration using porous hollow fibers coated with a semipermeable membrane.

It is yet another object of this invention to provide a system for purifying caustic solutions such as sodium aluminate solutions by reverse osmosis using porous hollow fibers coated with a semipermeable membrane wherein both the hollow fibers and the semipermeable membrane are capable of withstanding exposure to a caustic environment.

It is a further object of this invention to provide a system for purifying caustic solutions such as sodium aluminate solutions by reverse osmosis using porous polysulfone hollow fibers coated with a semipermeable sulfonated polysulfone membrane capable of withstanding exposure to a caustic environment.

These and other objects of the invention will become apparent from the following description and accompanying drawings.

In accordance with the invention, a system for the purification of a caustic solution to remove impurities therefrom comprises bringing the caustic solution into contact under pressure with the outside of a plurality of porous hollow fibers each having at least one open end and coated with a semipermeable membrane and collecting purified solution from the open ends of the hollow fibers.

BRIEF DESCRIPTION OF THE DRAWINGS

FIG. 3 is a graph showing the effect of pressure on filtration.

FIG. 4 is a flow sheet illustrating the system of the invention.

DETAILED DESCRIPTION OF THE INVENTION

As illustrated in the flow sheet in FIG. 4, in accordance with the invention, a caustic solution such as a solution of Bayer liquor which comprises sodium aluminate dissolved in caustic, may be purified by bringing the solution into contact, under pressure, with a filtration medium comprising a semipermeable membrane to separate the impurities from the solution.

Figure 1:
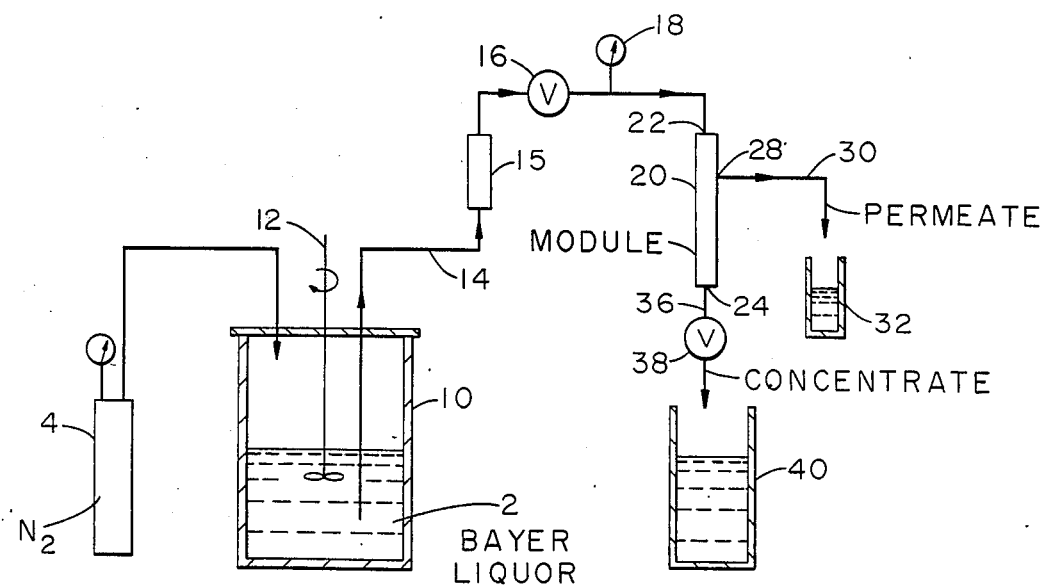
FIG. 1 is a diagram showing one embodiment of the invention.

Referring now to FIG. 1, Bayer spent liquor, i.e., a caustic sodium aluminate liquor from a Bayer process after initial precipitation, is shown at 2 inside a pressure vessel 10 which is maintained under pressure from a source of pressurized gas 4 such as a nitrogen source. The liquor is preferably maintained at a temperature above room temperature and is kept agitated by stirrer means 12. The heated and pressurized liquor is fed to an entrance port 22 in a filter module 20 through flow meter 15, valve 16 and pressure gauge 18 via line 14. The liquor is filtered in filter module 20 to provide a purified permeate which exits filter module 20 via permeate exit port 28 to line 30 and is collected in vessel 32. The unfiltered concentrate exits module 20 via concentrate exit port 24 to line 36 where it passes into reservoir 40 through valve 38.

The filter medium in filter module 20 comprises a plurality of porous hollow polysulfone fibers or tubes which have been coated with a sulfonated polysulfone coating to form a semipermeable membrane. The coated fibers within filter module 20 may comprise an annulus of helically wound porous hollow fibers. At least one end of all or most of the hollow fibers is open and these open ends are directed toward a portion of filter module 20 spaced apart from entrance port 22 and concentrate exit port 24. The purified liquid is then collected from these open ends of the porous fibers adjacent permeate exit port 28.

Construction details for filter modules of this type are generally described in U.S. Pat. Nos. 4,045,85; 4,207,192; 4,210,536; 4,220,489; 4,267,630; and 4,351,092; cross-reference to which is hereby made. Sulfonated polysulfone materials which may be used in forming the semipermeable membrane coating on the porous hollow fibers are described in U.S. Pat. Nos. 4,413,106 and 4,508,852; cross-reference to which is hereby made.

The pressure under which the liquor should be maintained during the filtration step preferably ranges from about 34 to 1380 kPa (5 to 200 psig), although higher pressures may be used and should be deemed to be within the scope of the practice of the invention. The temperature at which the liquor is maintained during filtration should preferably range from around 35° to 100° C. (95° to 212° F.), preferably about 72° C. (162° F.).

Figure 2:
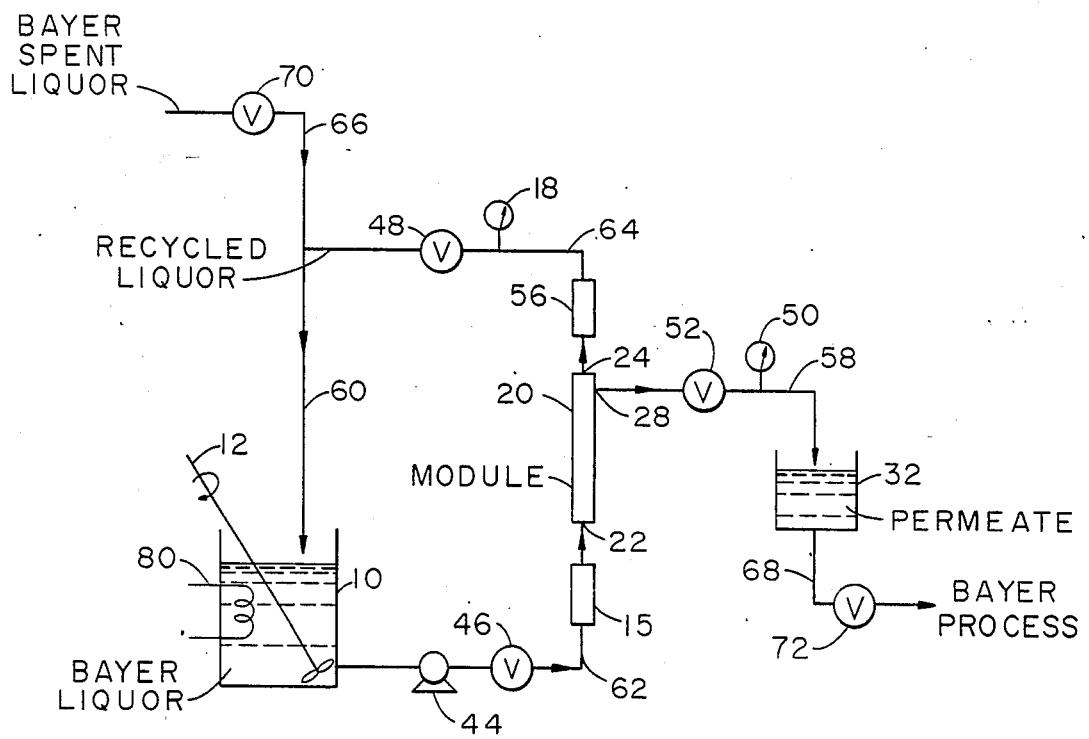
FIG. 2 is a diagram illustrating another embodiment of the invention.

While the process diagram of FIG. 1 illustrates the system of the invention as operated on a batch basis, the system advantageously, may be operated continuously as shown in FIG. 2. In FIG. 2, the Bayer spent liquor 2 in vessel 10 is pumped to filter module 20 by a pump 44 through line 62 while the flow is monitored by flow meter 15. The permeate discharged from module 20 via exit port 28 flows via line 58 through valve 52 to vessel 32 while the pressure of the flow is monitored by pressure gauge 50. The permeate may be returned to the Bayer process or otherwise utilized by removing the permeate from vessel 32 via line 68 through valve 72.

In this embodiment, pump 44 maintains the desired pressure on the filter membranes in filter module 20. The concentrate leaves module 20 via exit port 24 and line 64 to pass through flow meter 56 and valve 48. Pressure in line 64 is monitored by pressure gauge 18. Line 64 joins with liquor input line 66 to feed liquor back to vessel 10 via line 60. Additional liquor from a liquor precipitation stage or the like may thus be fed in via line 66 and valve 70, if desired, to be blended with the recycle stream of liquor concentrate in line 64. The temperature of the liquor is maintained in vessel 10 via heating means 80.

To illustrate the effectiveness of the system of the invention, several types of Bayer liquor were purified by the system shown in FIG. 3 using, respectively three different filter membranes of varying permeability. The results of the tests are shown in Tables I and II. Filtration rate data with respect to pressure is shown in the graph of FIG. 3. In each test, feed and permeate liquor sample were collected and analyzed for alumina, total caustic soda (TC), total alkali (TA), organic carbon, sodium oxalate, iron, silica, and liquor color.

The organic carbon and sodium oxalate concentrations of the liquor were analyzed using an Astro organic carbon analyzer Model 1850 and an ion chromatograph, respectively. Liquor color was measured by light transmission of 1:10 diluted samples at a wavelength of 435 nm. A reference of 100% for distilled water was used for comparison. Liquor color measurement was also conducted on undiluted samples at 691 nm. The decrease of the humate concentration in the liquor can be observed by the change in the color of the permeate. Equivalent humate concentration was measured by the liquor color at 691 nm and was directly correlated to the color of a standard humate solution in caustic liquor.

As shown in Table I, it was discovered that for liquor type "A", depending upon the permeability of the membrane, a decrease of the humate concentration of the permeate was observed as can be shown by the increase of the percentage of light transmission, measured at 691 nm, of from 82.6 up to 99.1%. This decrease was also measured by the increase in light transmission at 435 nm, of from 27.6 up to 80.3% with reference to 100% of distilled water. This translates to a decrease in humate concentration of 0.12 down to 0.01 gram/liter (g/l). In addition, organic carbon concentration was also lowered from 14.4 down to 9.1 g/l and sodium oxalate from 3.4 down to 1.1 g/l. For the less permeable membrane, it was observed that sodium carbonate and silicon dioxide were lowered, respectively, from 53 and 0.61 g/l to 49.9 and 0.33 g/l. Iron oxide was also slightly reduced from 0.005 to 0.004 g/l.

TABLE I

Membrane Ultrafiltration of Bayer Liquor "A" at 72° C.

| | Start Liquor | Membrane I Permeate | Corr.[1] | Membrane II Permeate | Corr.[1] | Membrane III Permeate | Corr.[1] |
|---|---|---|---|---|---|---|---|
| $Al_2O_3$ g/l | 80.7 | 82.3 | 76.2 | 82.4 | 76.3 | 82.7 | 79.7 |
| TC g/l | 189.7 | 204.8 | 189.7 | 202.4 | 189.7 | 196.6 | 189.7 |
| TA g/l | 242.7 | 254.4 | 235.6 | 255.7 | 239.6 | 253.1 | 244.2 |
| $SiO_2$ g/l | 0.61 | 0.37 | 0.34 | 0.35 | 0.33 | 0.52 | 0.50 |
| $Fe_2O_3$ g/l | 0.005 | 0.004 | 0.004 | 0.004 | 0.004 | 0.004 | 0.004 |
| Org. Carb. g/l | 14.4 | 9.8 | 9.1 | 10.4 | 9.7 | 13.6 | 13.1 |
| $Na_2CO_3$ g/l | 53.0 | 49.6 | 45.9 | 53.3 | 49.9 | 56.5 | 54.5 |
| $Na_2C_2O_4$ g/l | 3.4 | 1.2 | 1.1 | 1.5 | 1.4 | 3.1 | 3.0 |
| Humate g/l | 0.12 | 0.01 | — | 0.01 | — | 0.02 | — |
| A/TC | 0.425 | 0.402 | 0.402 | 0.407 | 0.402 | 0.421 | 0.420 |
| % Transmission | | | | | | | |
| 435 nm | 27.6 | 80.3 | — | 76.3 | — | 52.1 | — |
| 691 nm | 82.6 | 98.2 | — | 99.1 | — | 97.0 | — |
| Press. psig | — | 200 | — | 200 | — | 150 | — |
| Filt. Rate gal/sq ft/hr | — | $4.9 \times 10^{-2}$ | — | $12.2 \times 10^{-2}$ | — | $44.1 \times 10^{-2}$ | — |

[1]corrected value to the same caustic concentration of starting liquor

The results obtained when filtering liquor type "B" are shown in Table II. The humate concentration of the permeate in this instance was lowered as measured by the light transmission at 691 nm to provide an increase in light transmission of from 42.3 up to 98.4% and from 7.0 to 79.5% of the 1:10 diluted liquor samples measured at 435 nm. This corresponds to a drop in the humate concentration from 0.64 down to 0.01 g/l. Organic carbon concentration was lowered from 5.2 down to 2.1 g/l.

TABLE II

Membrane Ultrafiltration of Bayer Liquor "B" at 72° C.

| | Start Liquor | Membrane I Permeate | Corr.[1] | Membrane II Permeate | Corr.[1] | Membrane III Permeate | Corr.[1] |
|---|---|---|---|---|---|---|---|
| $Al_2O_3$ g/l | 42.7 | 42.1 | 40.2 | 42.1 | 40.2 | 42.9 | 42.1 |
| TC g/l | 141.0 | 147.7 | 141.0 | 147.7 | 141.0 | 143.8 | 141.0 |
| TA g/l | 203.8 | 201.5 | 192.3 | 207.1 | 197.7 | 207.1 | 203.1 |
| $SiO_2$ g/l | 0.29 | 0.31 | 0.29 | 0.29 | 0.29 | 0.29 | 0.28 |
| $Fe_2O_3$ g/l | 0.004 | 0.004 | 0.004 | 0.004 | 0.004 | 0.004 | 0.004 |
| Org. Carb. g/l | 5.2 | 2.2 | 2.1 | 2.4 | 2.3 | 3.6 | 3.5 |
| $Na_2CO_3$ g/l | 62.8 | 53.8 | 51.3 | 59.4 | 56.7 | 63.3 | 62.1 |
| $Na_2C_2O_4$ g/l | 2.9 | 2.6 | 2.5 | 2.9 | 2.8 | 3.0 | 2.9 |
| Humate g/l | 0.64 | 0.01 | — | 0.03 | — | 0.05 | — |
| A/TC | 0.302 | 0.285 | 0.285 | 0.285 | 0.285 | 0.298 | 0.298 |
| % Transmission | | | | | | | |
| 435 nm | 7.0 | 79.5 | — | 77.0 | — | 43.8 | — |
| 691 nm | 42.3 | 98.4 | — | 95.3 | — | 91.5 | — |
| Press. psig | — | 200 | — | 200 | — | 200 | — |
| Filt. Rate gal/sq ft/hr | — | $15.9 \times 10^{-2}$ | — | $28.1 \times 10^{-2}$ | — | $122.5 \times 10^{-2}$ | — |

[1]corrected value to the same caustic concentration of starting liquor

The effect of pressure on the filtration rate is shown for both Membrane II and Membrane III in FIG. 3. It will be noted that the filtration rate goes up for both membranes but rises more rapidly with pressure for the more porous Membrane III than Membrane II.

Thus, the invention provides an improved method for the purification of a caustic solution such as a sodium aluminate solution from a Bayer process wherein both organic and inorganic impurity levels may be reduced.

Having thus described the invention, what is claimed is:

1. A method for purification of a caustic sodium aluminate solution to remove impurities comprising organic carbon, humate, and sodium oxalate therefrom which comprises bringing the caustic solution into contact with the outside of a plurality of coated porous hollow polysulfone fibers and collecting purified solution from an open end of the hollow fibers.

2. The method of claim 1 including the further step of recycling the remainder of said sodium aluminate solution and said impurities back into contact with the outside of said hollow coated polysulfone fibers.

3. The method of claim 1 wherein said fibers are coated with a material which will inhibit the passage of impurities therethrough.

4. The method of claim 1 wherein said caustic solution is maintained under a pressure of from about 34 to at least 1380 kPa (about 5 to at least 200 psig) while in contact with said hollow fibers.

5. The method of claim 4 wherein said caustic solution is maintained at a temperature of from about 35° to about 100° C. (about 95° to about 212° F.) while in contact with said hollow fibers.

6. The method of claim 5 wherein said temperature is about 72° C. (162° F.).

7. The method of claim 5 wherein said caustic solution includes spent Bayer liquor.

8. The method of claim 5 wherein said porous hollow polysulfone fibers are coated with a sulfonated polysulfone coating.

9. A method for purification of a caustic sodium aluminate solution to remove impurities comprising organic carbon, humate, and sodium oxalate therefrom, which comprises:
- (a) bringing the caustic sodium aluminate solution into contact with the outside of a plurality of porous hollow polysulfone fibers each having at least one open end; and
- (b) collecting purified caustic sodium aluminate solution from the open ends of said fibers.

10. The method of claim 9 wherein said step of bringing the caustic sodium aluminate solution into contact with the outside of a plurality of porous hollow polysulfone fibers further includes the steps of: mounting said hollow coated fibers within a filter housing having an entrance port in communication with the outside surfaces of said coated fibers and an exit port in communication with the open end of said hollow fibers; and passing said caustic solution into said filter housing through said entrance port; and said method includes the further step of recycling the remainder of said sodium aluminate solution and said impurities back into said entrance port of said filter housing.

11. The method of claim 9 wherein said porous hollow polysulfone fibers are coated with a sulfonated polysulfone coating.

12. The method of claim 11 including the further step of maintaining said caustic sodium aluminate solution under a pressure of from about 34 to at least 1380 kPA (about 5 to at least 200 psig) while in contact with said coated fibers, whereby at least a portion of said caustic sodium aluminate solution will pass through said coating and said porous hollow fibers while excluding at least a portion of said impurities in the remainder of said caustic sodium aluminate solution.

13. The method of claim 12 including maintaining said caustic solution at a temperature of from about 35° to about 100° C. (about 95° to about 212° F.) during the step of contacting said coated fibers.

14. The method of claim 13 wherein said temperature is maintained at about 72° C. (162° F.) during said contacting step.

15. A method for purifying a caustic solution containing sodium aluminate and impurities, said impurities comprising organic carbon, humate, and sodium oxalate, which comprises:
- (a) pumping said solution under pressure to an entrance port in a filtration module;
- (b) contacting a plurality of coated porous hollow fibers in said filtration module with said solution;
- (c) collecting purified caustic sodium aluminate solution with a reduced level of said impurities from open ends in said hollow fibers; and
- (d) recycling the remainder of said caustic sodium aluminate solution back to said entrance port in said filtration module.

16. The method of claim 15 wherein said coated porous hollow fibers comprise porous hollow polysulfone fibers coated with a sulfonated polysulfone coating capable of functioning as a reverse osmosis membrane to permit said solution to pass therethrough under pressure while excluding impurities.

17. The method of claim 16 including the further step of maintaining said caustic solution under a pressure of from about 34 to at least 1380 kPa (about 5 to at least 200 psig) while in contact with said coated fibers to permit at least a portion of said solution to pass through said coating and said porous hollow fibers by reverse osmosis.

18. The method of claim 17 including maintaining said caustic solution at a temperature of from about 35° to about 100° C. (about 95° to about 212° F.) during the step of contacting said coated fibers with said caustic solution.

19. A method for purifying a caustic solution containing sodium aluminate to remove organic impurities therefrom which comprises:
- (a) heating said solution to a temperature of from about 35° to about 100° C. (about 95° to about 212° F.);
- (b) pumping said solution under a pressure of from about 34 to at least 1380 kPa (about 5 to at least 200 psig) to an entrance port in a filtration module;
- (c) bringing said solution into contact with the outside surface of a sulfonated polysulfone membrane coated on a plurality of porous hollow polysulfone fibers in said filtration module;
- (d) collecting purified liquid from an exit port in said filtration module in communication with open ends in said hollow fibers; and
- (e) recycling the remainder of said solution and said impurities back to said entrance port in said filtration module.

* * * * *